United States Patent [19]

Brown

[11] Patent Number: 4,983,344

[45] Date of Patent: Jan. 8, 1991

[54] METHOD FOR INJECTION MOLDING A SEALED CONNECTOR ASSEMBLY

[75] Inventor: Thomas E. Brown, Mechanicsburg, Pa.

[73] Assignee: AMP Incorporated, Harrisburg, Pa.

[21] Appl. No.: 542,669

[22] Filed: Jun. 22, 1990

Related U.S. Application Data

[63] Continuation of Ser. No. 285,672, Dec. 16, 1988, abandoned.

[51] Int. Cl.$^5$ ............................................. B29C 45/16
[52] U.S. Cl. .................................. 264/255; 264/328.7; 264/328.16
[58] Field of Search .................... 264/255, 246, 328.7, 264/328.8, 328.11, 328.16; 425/130, 134

[56] References Cited

U.S. PATENT DOCUMENTS

| | | | |
|---|---|---|---|
| 3,475,530 | 12/1965 | Cooper | 264/246 |
| 3,838,382 | 9/1974 | Sugar | |
| 3,966,870 | 6/1976 | Vecchiotti | 264/255 |
| 4,090,759 | 5/1978 | Herrmann, Jr. | |
| 4,123,488 | 10/1978 | Lawson | 264/255 |
| 4,318,874 | 3/1982 | Lemelson | 264/40.1 |
| 4,416,602 | 11/1983 | Neumeister | 425/130 |
| 4,792,425 | 12/1988 | Weaver | 264/255 |

FOREIGN PATENT DOCUMENTS

| | | |
|---|---|---|
| 0049390 | 9/1981 | European Pat. Off. |
| 1415657 | 3/1969 | Fed. Rep. of Germany |
| 3114827 | 11/1982 | Fed. Rep. of Germany |
| 2572676 | 5/1986 | France |
| 0968707 | 9/1964 | United Kingdom |
| 2068654 | 8/1981 | United Kingdom |
| 2167249 | 5/1986 | United Kingdom |

OTHER PUBLICATIONS

European Search Report dated 8/23/89.

*Primary Examiner*—Jan H. Silbaugh
*Assistant Examiner*—Catherine Timm
*Attorney, Agent, or Firm*—Katherine A. Nelson

[57] ABSTRACT

A sealed electrical connector 10 has first and second insulated body members 12, 38 and a plurality of terminal members. At least one body member 12 includes a first thermoplastic portion 14 and a second thermoset portion 24 formed in a common mold. The material for the thermoplastic portion 14 has a melting temperature $T_1$ and the material for the thermoset portion 24 has a curing temperature $T_2$ wherein $T_2 < T_1$. The thermoplastic material is injected into a first mold cavity and is cooled to a temperature lower than $T_1$ and higher than $T_2$ to form a solid first body portion. An internal mold portion within the closed mold is moved to form an additional mold cavity adjacent the first mold cavity. The configuration of the second mold cavity is at least partially defined by part of a surface of the first body portion. The thermoset material is injected into the additional cavity at a temperature lower than $T_2$. The thermoset material body member is cured by heat transmitted across the common interfacial surface 25 by the cooling of the thermoplastic material and the mold 72 in which the connector is formed. The thermoplastic material preferably is relatively rigid and forms an outer body section 14 and the thermoset material is relatively resilient and forms an inner body section 24 of the connector member.

6 Claims, 4 Drawing Sheets

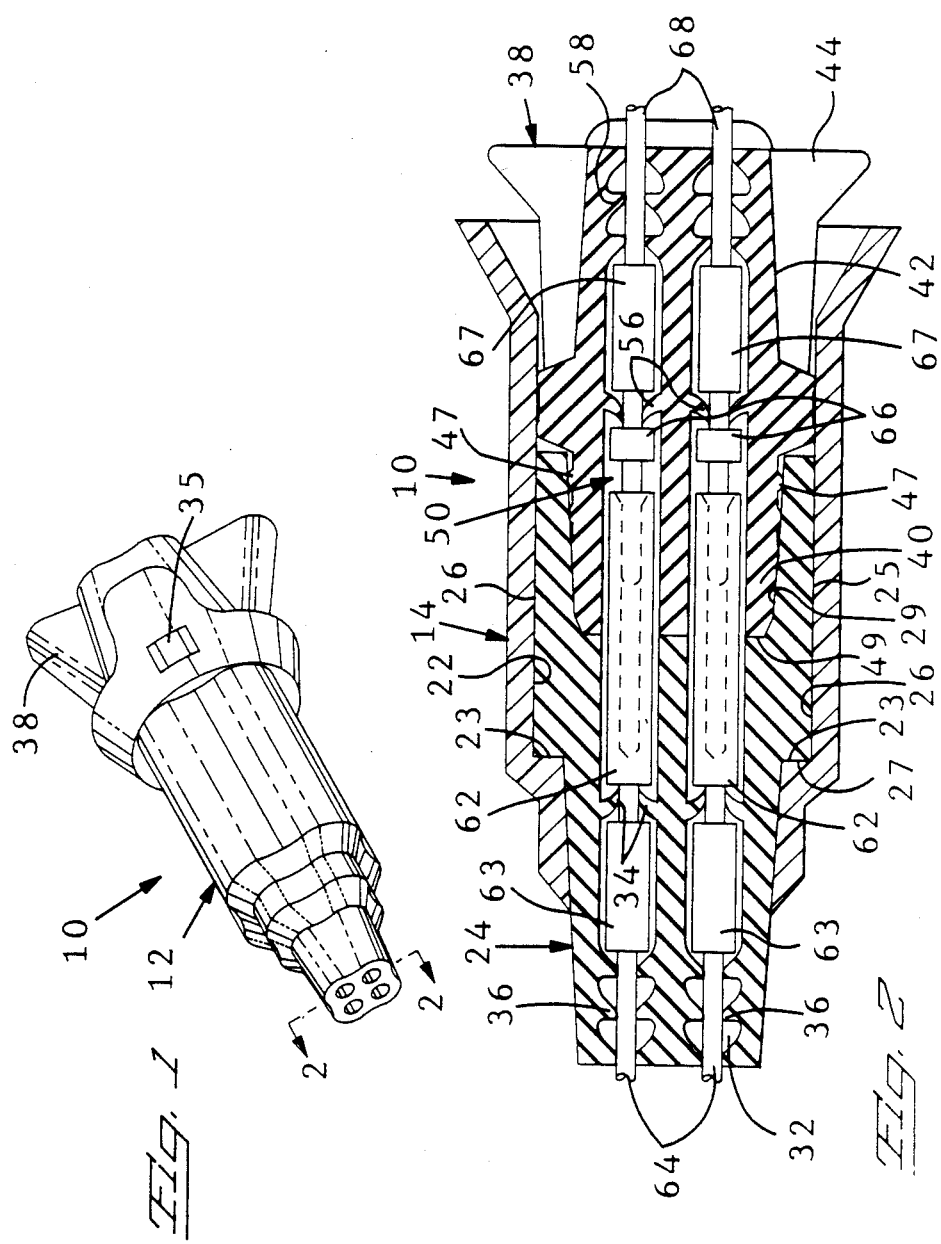

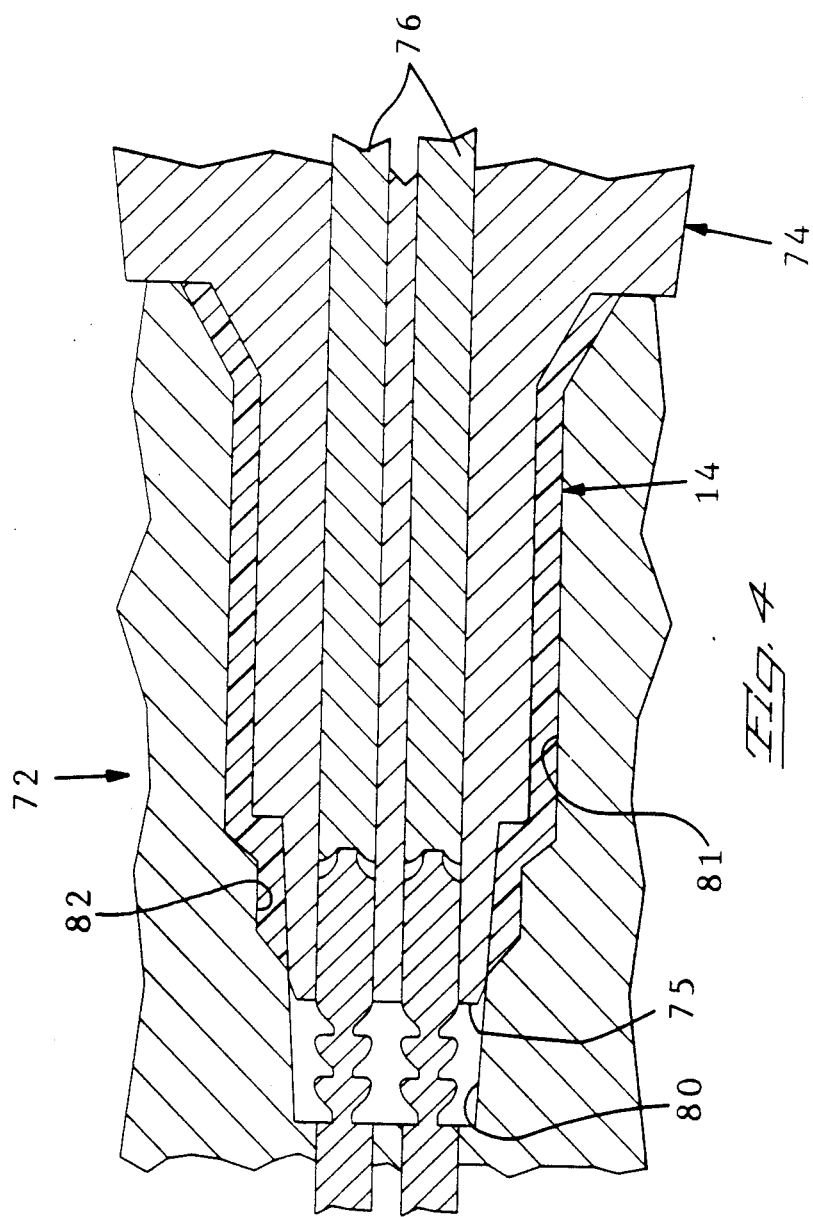

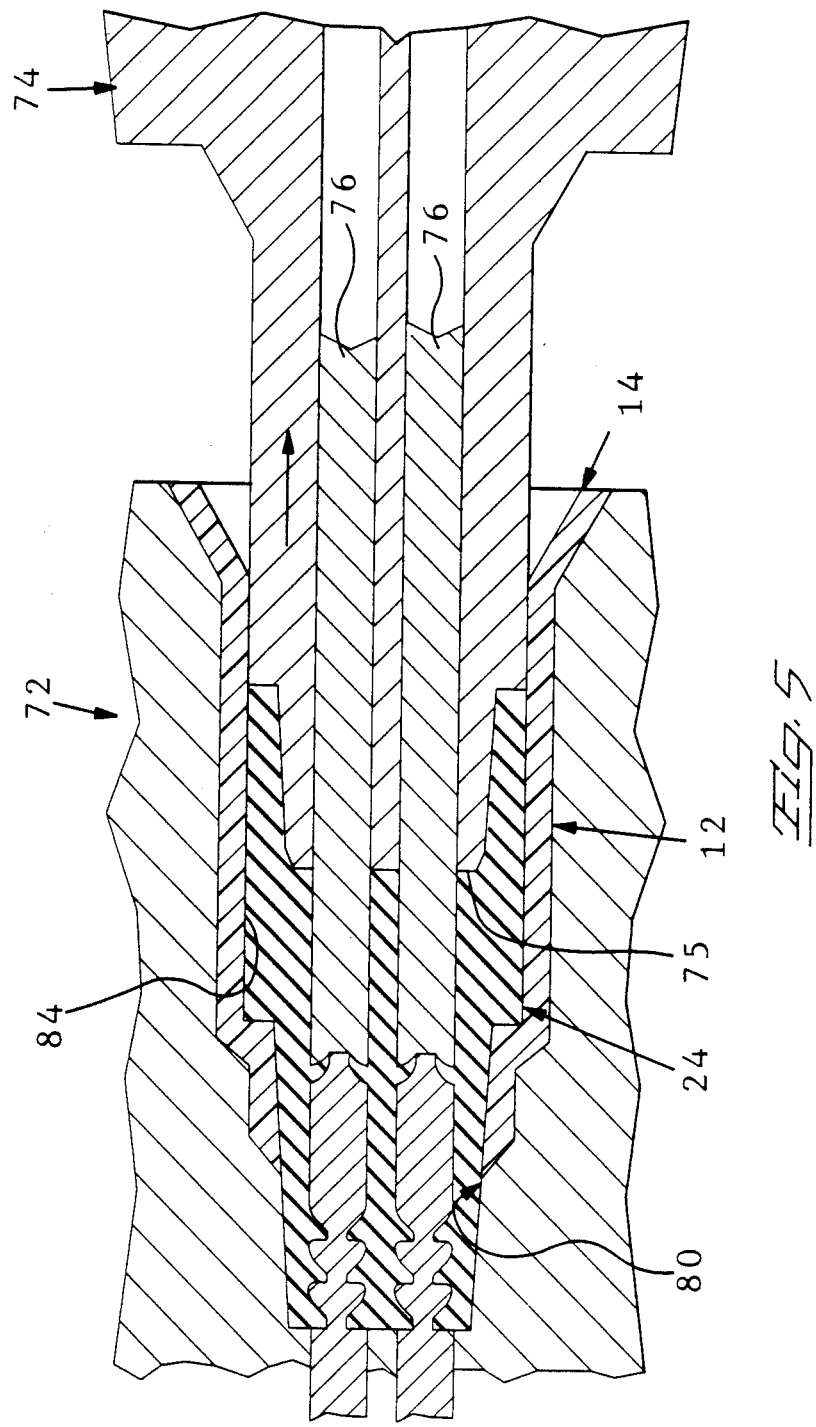

METHOD FOR INJECTION MOLDING A SEALED CONNECTOR ASSEMBLY

This application is a continuation of application Ser. No. 07/285,672 filed Dec. 16, 1988, now abandoned.

FIELD OF THE INVENTION

This invention relates, generally, to an environmentally sealed connector having both rigid and flexible materials therein, and more specifically to a dual molded electrical connector.

BACKGROUND OF THE INVENTION

It is known in the electrical connector arts to use rigid and flexible material in the same connector. Such uses however, are generally in the form of washers, O-rings or by physical mating through glues, force fits or threading of flexible materials to rigid material. Such combinations are generally used to provide environmental sealing, or strain relief or to allow for replacement or insertion of electrical terminal members. U.S. Pat. Nos. 4,090,759 and 3,838,382, for example, disclose such uses.

U.S. patent applications Ser. No. 06/862,902 filed May 13, 1986, a Continuation-In-Part of U.S. patent application Ser. No. 453,327 filed Dec. 27, 1982 and application Ser. No. 06/882,751 filed July 7, 1986 disclose electrical connectors in which the body members include rigid and flexible portions that are integrally molded so as to become a unitary piece. Since these portions must be integrally joined, the materials selected for the two portions must be such that they are compatible and establish a bond between them. The choices for the materials, therefore, cannot always be selected in accordance with properties desired for the connector, because the materials having the specifically desired properties may not, in fact, be compatible with each other. It is desirable, therefore, to have a connector which can be molded in a dual injection molding system whereby the materials used do not require bonding therebetween.

The one piece housing depicted in the aforementioned patent applications is formed by a dual molding process in which one material is first injected into a cavity of a mold followed by the movement of core pins or sleeves to define one or more joining cavities into which the second material can be injected. The disclosures of the above mentioned pending patent applications are incorporated herein by reference.

SUMMARY OF THE INVENTION

Accordingly, it is an object of the present invention to alleviate the disadvantages and deficiencies of the prior art by providing a dual molded sealed electrical connector assembly that is especially adapted for use at elevated operating temperatures.

It is a further object of the present invention to provide a dual molded sealed electrical connector having rigid and flexible portions that need not rely on bonding between the rigid and flexible materials.

It is another object of the invention to provide sealed electrical connector having rigid and flexible portions and a means for forming thereof wherein the materials used for the two portions need not be compatible with each other.

It is an additional object of the invention to provide a means whereby the electrical connector member may be formed from a combination of thermoplastic and thermoset materials.

Additionally, it is an object of the invention to provide a sealed electrical connector that is stable and reliable even under conditions of use wherein the temperature may exceed 150° C.

It is also an object of the invention to provide a cost effective method for making a sealed electrical connector.

For purposes of illustration, the invention will be described in terms of making a representative receptacle member of an electrical connector assembly. It is to be understood that both plug and receptacle members may be made in accordance with the invention.

The sealed electrical connector of the present invention includes an insulated body comprising a first portion formed of thermoplastic material and a second portion comprised of thermoset material, the portions being formed in a common mold. In accordance with the invention, the thermoplastic material has a melting point of $T_1$ and a thermoset material has a curing temperature $T_2$ and $T_2$ is less than $T_1$. The two body portions have a common interfacial surface extending between the thermoplastic and thermoset materials wherein the thermoset material is cured by heat transmitted thereto across the common interfacial surface by the cooling of the thermoplastic material and the mold in which the connector member is formed.

In the presently preferred embodiment, the thermoplastic material forms the outer portion of the body of the receptacle member and the thermoset material forms the inner portion of the receptacle body with the thermoplastic material being relatively rigid and the thermoset material being relatively flexible. It is to be understood, however, that the configuration of a connector member made in accordance with the present invention is not limited to the above structure.

This invention is also directed to a method for making an electrical connector member comprising the steps of: selecting a thermoplastic material having a melting temperature of $T_1$; selecting a thermoset material having a curing temperature of $T_2$, wherein $T_2$ is less than $T_1$; forming a first body portion from the thermoplastic material in a first mold cavity; cooling the thermoplastic material to a temperature sufficient to retain rigidity of the first body portion; moving an internal mold portion to form at least one additional mold cavity adjacent the first mold cavity; injecting the selected thermoset material into the at least one adjacent cavity; and curing the thermoset material by means of heat transmitted thereto across a common interfacial surface between the first and second cavity from the cooling of the thermoplastic material and the mold.

The invention itself, together with further objects and its intended advantages, will be best understood by reference to the following detailed description taken in conjunction with accompanying drawings.

BRIEF DESCRIPTION OF THE DRAWINGS

FIG. 1 is a perspective view of an electrical connector assembly made in accordance with this invention.

FIG. 2 is a cross sectional view of the connector assembly taken along the line 2—2 of FIG. 1 and having contact terminals disposed therein.

FIG. 4 is a cross sectional fragmentary view of a mold illustrating indicating the position of the mold for forming a first portion of the housing.

FIG. 5 is a view similar to FIG. 3 showing the mold in a second position for forming the second portion of the connector housing.

DETAILED DESCRIPTION OF THE DRAWINGS

Figure 3:
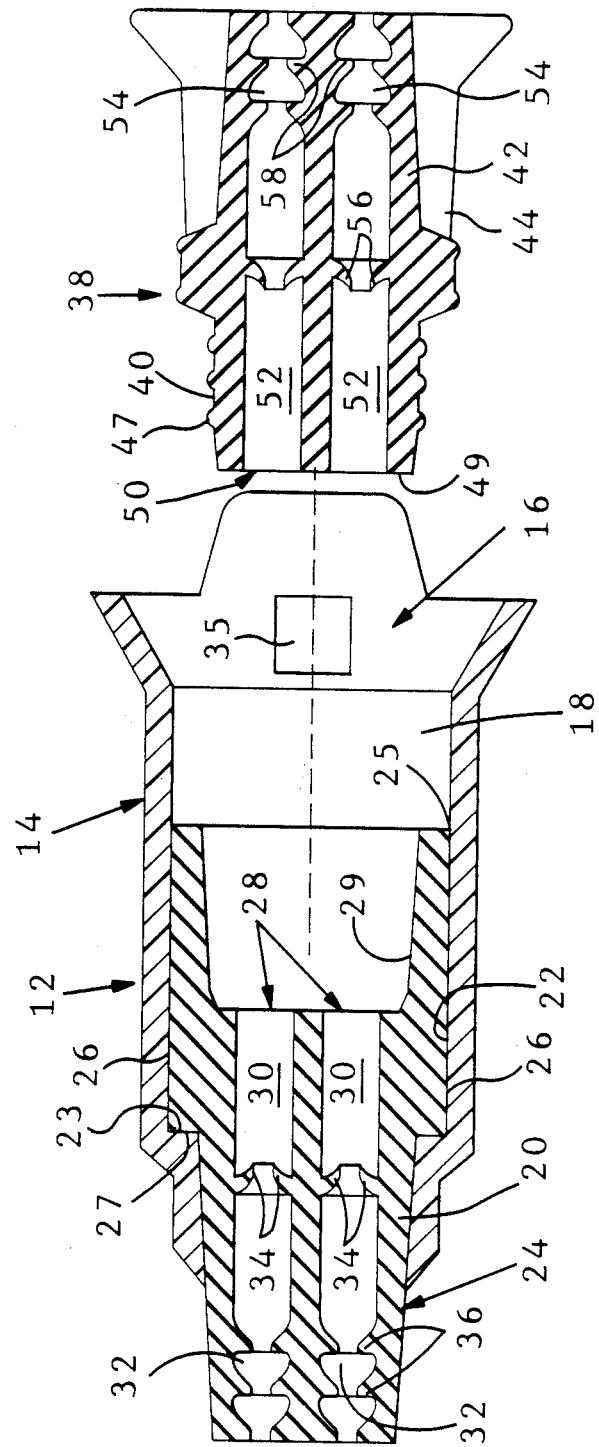
FIG. 3 is an exploded cross sectional view of the plug and receptacle housing members of the connector of FIG. 1.

Referring now to FIGS. 1, 2 and 3, an electrical connector assembly 10 is comprised of receptacle member 12 and plug member 38. For purposes of illustration, the invention will be described in terms of making a representative receptacle member of an electrical connector assembly. It is to be understood that either or both plug and receptacle members may be made in accordance with the invention.

Receptacle member 12 is comprised of a first or outer portion 14 and second or inner portion 24. Outer receptacle portion 14 has a cavity 16 extending therethrough, having forward and rearward sections 18, 20. Forward section 18 is dimensioned for receiving therein at least a portion of complimentary mating plug member 38 as best seen in FIGS. 2 and 3. Second receptacle portion 24 has outer surface 26 and includes a plurality of terminal receiving passageways 28 therein having a first forward portion 30 for receiving pin members 62 adapted to be mated with corresponding complimentary socket members 66 of plug member 38 as shown in FIG. 2. The second portion passageways 28 further include second sections 32 having wire sealing portions 36. Second receptacle portion 24 is disposed in passageway 16 of first receptacle portion 14 such that a substantial portion of outer surface 26 of second portion 24 lies along a substantial portion of inner surface 22 of first portion 14.

First portion 14 further includes stop surfaces 23 for engaging radially extending surface 27 of second receptacle portion 24 to secure second portion 24 in first portion 14 and prevent further rearward movement of second portion 24 when receptacle and plug members 12, 38 are mated. First and second receptacle portions 14, 24 have a common interfacial surface 25 extending therebetween. As shown in FIGS. 2 and 3, passageways 28 are profiled to receive pin contact members 62 in forward passageway portion 30 and sealingly receive wire members 64 terminated to contact members 62 at 63 in rearward passageway portion 32 as seen in FIG. 2. Passageways 28 include a plurality of inwardly extending projections 34 which grip contact member 62 and a plurality of wire sealing projecting ribs 36, which provide environmental seals for the wire members 64 body 14 further includes means 35 for latching receptacle 12 to plug 38. The forward end of inner portion 28 includes cavity 29 dimensioned to receive and sealingly engage a complimentary meeting member.

In the embodiment shown, plug 38 is formed as a unitary member from a flexible material. It is to be understood that plug member 38 may also be formed with a combination of rigid and flexible materials. Plug member 38 includes a forward mating portion 40 and a rearward portion 42 having wire sealing means and flange portions 44. Forward mating portion 40 of plug member 38 is adapted to be received in forward receptacle cavity section 18 such that outer edges of flexible mating portion 40 engage the inner peripheral surfaces 22 of first receptacle portion 14 to form sealing engagement therewith. Plug member 38 includes a plurality of electrical contact terminal receiving passageways 50 profiled for receiving electrical contact members 66 in forward portions 52 thereof and sealingly receive wire members 68 in rearward passageway 54 therein. Contact members 66 are terminated to wire members 68 at 67.

The passageways 50 in body member 40 include a plurality of inwardly extending projections 56, as best seen in FIG. 2, which grip the contact members 66 and a plurality of wire sealing projecting ribs 56, which provide environmental seals for the wire members 68. The mating portion 40 is designed to form a seal at the mating interface of receptacle member 12 and plug member 38 as seen in FIGS. 2 and 3. The outer surface of forward mating portion 40 includes front face 49 and a plurality of annular rings 47, which engage inner surfaces of second portion cavity 29 to seal the interface.

The method of making the preferred embodiment will be described with reference to FIGS. 4 and 5 and to receptacle member 12. It is to be understood that the similar method may be used for making the plug member 38 if the plug is to be formed from more than one material. It is also to be understood that the plug and receptacle shown in the figures is merely a representative sample of the type of housing members for connectors that can be made in accordance with the present invention.

In the preferred embodiment of the invention the outer housing or first receptacle portion 14 is formed of a rigid thermoplastic material having a melting point of $T_1$. The inner housing or second portion 24 is formed of a relatively resilient thermoset material having a curing temperature of $T_2$, wherein $T_2$ is less than $T_1$. FIGS. 4 and 5 explain the method for making receptacle member 12. Receptacle member 12 is formed, generally, in a dual molding process in which one material is first injected into a first mold cavity followed by the movement of a core pin or sleeve to define one or more adjoining cavities into which a second material can be injected. The basic function of the mold is more fully described in U.S. patent application Ser. No. 06/882,751 previously incorporated by reference herein. FIGS. 4 and 5 disclose a portion of a mold 72 for forming the receptacle member 12. Mold 72 includes a cavity 80 having a sliding sleeve member 74 and a plurality of core pins 76 when sleeve member 74 is in its first position as shown in FIG. 4, sleeve member 74 is aligned in the cavity 80 of the mold 72 such that a first cavity portion 82 is formed between the outer surface of sleeve 74 and the surrounding surface 81 of cavity 80, the first cavity portion defining the shape of the first portion 14 of receptacle member 12. As can be seen in FIG. 2, the outer end 75 of the sleeve 74 extends beyond the rearward section 20 of the receptacle member 12 blocking off a portion 84 of cavity 80, the outer surface of sleeve 74 defining passageway 16 including the interfacial surface 26 of receptacle member 12. The material used for the outer portion is injected into the mold by means known in the art (not shown) such that the outer body portion 14 is formed in the desired shape. The first material is allowed to cool to a temperature lower than its melting temperature $T_1$ but higher than the curing temperature $T_2$ of the second material.

After body 14 has cooled sufficiently to retain its shape, the mold sleeve 74 is withdrawn to its second position as seen in FIG. 5 thus creating mold cavity 84 for receiving the second material. Second material in injected into cavity 84 to form second portion 24 of the receptacle member 12. In the preferred embodiment, the outer material is a thermoplastic material having a melting temperature $T_1$ that is greater than the curing temperature $T_2$ of thermoset material that is to be used in the inner or second member. The heat generated by the cooling thermoplastic outer member 14 provides sufficient heat to cure the inner thermoset material. The heat of the mold 72 supplies sufficient heat to cause the curing of the extending second section of second portion 24. The transfer primarily occurs along the interfacial surface 26 between outer portion 14 and the inner portion 24. It is desirable, therefore, that there be a substantial portion of interfacial surface to provide a large heat transfer surface and minimize the time that the mold must be retained in a closed state.

The material used for outer portion 14 in the preferred embodiment is a high temperature rigid thermoplastic such as a liquid crystal polymer, polyphenylsulfide, polyethersulphone, polyethylene terephthalate and similar materials which are processible in heated molds, as known in the art. The material used for inner portion 24 in the preferred embodiment is a thermosetting relatively resilient silicone, which cures in a relatively short time at a temperature in the range of 177° C. The melting temperature, $T_1$, for the aforementioned thermoplastic materials is in the range of 315° C. For example, receptacle members 12 can be made using polyethersulphone as the rigid material and liquid silicone rubber as the flexible material. Polyethersulphone has a melting range of 340°-377° C. and the silicone rubber has a time related curing range with rapid results being achievable at temperatures above 150° C. It is to be understood other materials and temperatures may be used. The sealing interface is between flexible sections 42, 24 and more specifically front face 49 of plug inner portion 42 and front face 25 of inner receptacle member 12. Outwardly projecting annular ridges 47 on plug portion 42 sealingly engage surface 29 of inner member 24 to form major sealing surface and in addition seal against inner surface 15 of outer receptacle portion 14.

As can be seen in FIGS. 2 and 3, the rigid portion 14 of the receptacle member generally provides a means to make the assembly rigid and provides a protective sleeve over the more flexible inner portions and sealed areas of respective members. The inner portions in turn acts as a shock absorber to protect the contact terminals. Since the sealing of the connector occurs between flexible forward portion of the plug member and a corresponding portion of the receptacle member, the pressure exerted between the two parts is sufficient to form a seal between the outer surface of the plug and the inner surface of the receptacle members.

The design of this, connector assembly provides a means whereby a sealed connection can be formed between the contact members wherein the outer sleeve member portion of the connector need not be bonded to the inner flexible portion. Since this bonding is not required for the dual injection molded part in accordance with the present invention, a greater variety of materials may be used than possible in the prior art. The resulting electrical connector assembly therefore can be made from materials that will withstand higher temperatures of operation and provide the necessary elastomeric properties for operating in the higher temperature range. The present invention provides a cost effective method for dual molding of sealed connectors.

It is thought that the electrical connector assembly and the method of the present invention and many of it attendant advantages will be understood from the foregoing description. Changes may be made in the form, construction and arrangement of parts thereof without departing from the spirit and scope of the invention or sacrificing all of its material advantages.

What is claimed is:

1. A method for molding a housing member for a sealed electrical connector, the housing member having an insulated body including a first relatively rigid portion and a second relatively flexible portion joined along a common interfacial surface, the method comprising the steps of:
   selecting a thermoplastic material having a melting temperature of $T_1$;
   selecting a thermoset material having a curing temperature of $T_2$, wherein $T_2$ is less than $T_1$;
   selecting a mold apparatus defining a first mold cavity, a portion of said first cavity being defined by an inner face of a selected mold portion in a first position, said selected portion being retractable to at least a second position to define at least a second, larger mold cavity while the mold apparatus remains closed, said mold apparatus remaining closed continuously during said retracting of said selected portion;
   injecting said thermoplastic material into said first mold cavity;
   cooling said injected thermoplastic material to a temperature lower than $T_1$ and higher than $T_2$ thereby forming a solid first body portion, while maintaining a mold temperature at a level lower than $T_1$ and higher than $T_2$;
   moving said selected mold portion while maintaining said mold apparatus closed, to form said at least second mold cavity adjacent said first mold cavity, said second mold cavity being at least partially defined by at least a section of a surface of the first body portion; and
   injecting said selected thermoset material into said at least second cavity, said thermoset material being injected at a temperature below said curing temperature $T_2$; whereby
   heat is transmitted across said common interfacial surface from said first body portion to said thermoset material adjacent thereto, facilitating rapid curing, in cooperation with heat transmitted to other portions of said thermoset material from the mold surfaces without opening said mold apparatus until after said thermoset material has been molded.

2. The method of claim 1 wherein said thermoplastic material is selected from the group consisting of liquid crystal polymers, polyphenylsulfide, polyethersulphone, polyethylene terephthalate.

3. The method of claim 1 wherein said thermoplastic material is polyethersulphone.

4. The method of claim 1 wherein said thermoset material is a resilient silicone rubber.

5. The method of claim 1 wherein said thermoplastic material is polyethersulphone and said thermoset material is resilient silicone rubber.

6. The method of claim 2 wherein said thermoset material is resilient silicone rubber.

* * * * *